(12) United States Patent
Goutte et al.

(10) Patent No.: US 7,139,754 B2
(45) Date of Patent: Nov. 21, 2006

(54) METHOD FOR MULTI-CLASS, MULTI-LABEL CATEGORIZATION USING PROBABILISTIC HIERARCHICAL MODELING

(75) Inventors: Cyril Goutte, Le Versoud (FR); Eric Gaussier, Eybens (FR)

(73) Assignee: Xerox Corporation, Stamford, CT (US)

( * ) Notice: Subject to any disclaimer, the term of this patent is extended or adjusted under 35 U.S.C. 154(b) by 473 days.

(21) Appl. No.: 10/774,966

(22) Filed: Feb. 9, 2004

(65) Prior Publication Data

US 2005/0187892 A1     Aug. 25, 2005

(51) Int. Cl.
    *G06F 17/30*     (2006.01)
(52) U.S. Cl. .................. 707/4; 707/3; 707/5; 707/6; 704/9
(58) Field of Classification Search .................. 707/3, 707/5–6; 704/9
    See application file for complete search history.

(56) References Cited

U.S. PATENT DOCUMENTS

| | | | |
|---|---|---|---|
| 5,687,364 A * | 11/1997 | Saund et al. ................... | 704/5 |
| 7,080,063 B1 * | 7/2006 | Campos et al. ................. | 707/2 |
| 2001/0037324 A1 * | 11/2001 | Agrawal et al. ................ | 707/1 |
| 2002/0059202 A1 * | 5/2002 | Hadzikadic et al. ........... | 707/3 |
| 2002/0120619 A1 * | 8/2002 | Marso et al. ................... | 707/3 |
| 2003/0101187 A1 | 5/2003 | Gaussier et al. ............... | 707/100 |

OTHER PUBLICATIONS

A.K. McCallum, Multi-Label Text Classification with a Mixture Model Trained by EM, AAAI'99 Workshop on Text Learning (Mccallum 1 999), pp. 1-7.*
E. Gaussier, C. Goutte, K. Popat, F. Chen, "A hierarchical model for clustering and categorising documents", F. Crestani, M. Girolami and C.J. van Rijsbergen (eds), *Advances in Information Retrieval—Proceedings of the 24th BCS-IRSG European Colloquium on IR Research*, Lecture Notes in Computer Science 2291, Springer, 2002, pp. 229-247.
A.K. McCallum, Multi-Label Text Classification with a Mixture Model Trained by EM, *AAAI'99 Workshop on Text Learning* (Mccallum 1 999), pp. 1-7.

* cited by examiner

*Primary Examiner*—Sathyanarayan Pannala
(74) *Attorney, Agent, or Firm*—Jeannette Walder

(57) ABSTRACT

A method of categorizing objects in which there can be multiple categories of objects and each object can belong to more than one category is described. The method defines a set of categories in which at least one category is dependent on another category and then organizes the categories in a hierarchy that embodies any dependencies among them. Each object is assigned to one or more categories in the set. A set of labels corresponding to all combinations of any number of the categories is defined, wherein if an object is relevant to several categories, the object must be assigned the label corresponding to the subset of all relevant categories. Once the new labels are defined, the multi-category, multi-label problem has been reduced to a multi-category, single-label problem, and the categorization task is reduced down to choosing the single best label set for an object.

8 Claims, 3 Drawing Sheets

METHOD FOR MULTI-CLASS, MULTI-LABEL CATEGORIZATION USING PROBABILISTIC HIERARCHICAL MODELING

CROSS-REFERENCE TO RELATED APPLICATIONS

This application is related to co-pending, U.S. patent application Ser. No. 09/982,236 filed Oct. 19, 2001, to Eric Gaussier, et al. for Methods, Systems, and Articles of Manufacture for Soft Hierarchical Clustering of Co-Occurring Objects ("D/A0A25"), the contents of which is incorporated herein by reference.

FIELD OF THE INVENTION

This invention relates generally to methods for categorization and classification of objects, and more particularly, to a method for multi-class, multi-label categorization of documents using probabilistic modeling.

BACKGROUND OF THE INVENTION

In an electronic repository, imprecisely classified documents are lost documents, a drain on productivity. There are no universally accepted standards for classifying or categorizing documents. A class or category is a group, set, or kind sharing common attributes or a division within a system of classification. Categories vary from one industry to the next and from one organization to another. There are two types of categorization: flat, in which categories are independent of each other, and hierarchical, where relations between categories themselves are exploited by the system (e.g., "molecular biology" is a sub-category or sub-class or "biology", but is also related to the category "chemistry".)

Classification and categorization schemes typically involve assigning labels to an object (where an object may be a document, or arbitrary co-occurrence data in a document or a vector in an arbitrary vector space and where a label is a descriptive or identifying word or phrase). We address the problem of assigning multiple labels to an object, where each label is taken among multiple (i.e., more than two) classes or categories. Although it may seem at first glance that this problem is similar to multi-class, single-label classification, it is both much less studied and quite different in nature. The problem of assigning multiple labels to a single object may be described in terms of document categorization, although it applies naturally to arbitrary objects (e.g., images, sensor signals, etc.).

Single-label classification also goes by the name of discrimination, and may be seen as a way to find the class that is best suited to a document. In a way, the essence (and limitation) of single-label classification is well represented by the semantics of the word "discriminate," that is "to recognize a distinction between things". On the other hand, multi-label classification is more concerned with identifying likeness between the document and (potentially) several classes. In the context of newswire stories, for example, labels are often overlapping, or may have a hierarchical structure. A story on Apple's iPod, for example, may be relevant to "computer hardware", its sub-category "audio peripheral" as well as the "MP3 player" category. Accordingly, multi-label classification is more relevant to identifying likeness than distinction.

Current classification technology focuses on discrimination methods, for example: linear discriminants such as linear least squares, Fisher linear discriminant or Support Vector Machines (SVM); decision trees; K-nearest neighbors (KNN); neural networks, including multi-layer perceptrons (MLP) and radial basis function (RBF) networks; and probabilistic generative models based e.g., on mixtures (typically Gaussian mixtures). In addition, some techniques have been proposed to address more specifically document categorization, such as Rocchio's, Naïve Bayes, or related probabilistic methods, as described e.g., by Gaussier et al., "A hierarchical model for clustering and categorising documents", in F. Crestani, M. Girolami and C. J. van Rijsbergen (eds), *Advances in Information Retrieval—Proceedings of the 24th BCS-IRSG European Colloquium on IR Research*, Lecture Notes in Computer Science 2291, Springer, pp. 229–247, 2002.

None of these classification techniques address the problem of assigning multiple labels to a single document or object, but virtually all of them can be altered to do it, for example, by using one of the following two alternative techniques. The first technique consists of first building a binary classifier (e.g., using SVM) for each class and then using these independently to provide any number of labels. The second one applies to probabilistic methods that typically produce a posterior class probability $P(c|d)$. Rather than assign document d to the class c that has maximum probability, the alternative is to choose a threshold and assign the document to all classes exceeding it.

The inventors' co-pending application D/A0A25 addresses the problem of clustering documents using probabilistic models. Clustering and categorization can be seen as two sides of the same coin, and differ by the fact that categorization is a supervised task, i.e., labels identifying categories are provided for a set of documents (the training set), whereas, in the case of clustering the aim is to automatically organize unlabelled documents into clusters, in an unsupervised way. The D/A0A25 model lies in its capacity to deal with hierarchies of clusters, based on soft assignments while maintaining a distinction between document and word structures.

What is needed is a method that allows the assignment of objects to multiple categories or classes such that the number of categories may be larger than two (multi-class) and such that each object may be assigned to more than one category (multi-label).

SUMMARY OF THE INVENTION

A method for categorizing a set of objects, according to one aspect of the invention, includes defining a set of categories in which at least one category in the set is dependent on another category in the set; organizing the set of categories in a hierarchy that embodies any dependencies among the categories in the set; for each object, assigning to the object one or more categories $1_1 \ldots 1_P$, $1_i \in \{1 \ldots L\}$, where $1 \ldots L$ represent L possible categories and where the assigned categories $1_1 \ldots 1_P$ represent the set of categories for which the object is relevant. The method further includes defining a new set of labels z comprising all possible combinations of any number of the categories, $z \in \{\{1\}, \{2\}, \ldots \{L\}, \{1,2\}, \ldots \{1,L\}, \{2,3\}, \ldots \{1,2,3\}, \ldots \{1, 2, \ldots L\}\}$, such that if an object is relevant to several categories, the object is assigned the unique label z corresponding to the subset of relevant categories.

The method of categorizing objects allows the assignment of objects to categories such that the number of categories may be larger than 2 (multi-class) and each object may be assigned to more than one category (multi-label). An application of particular interest is document categorization, although the method may be applied to any object that can be expressed either as a vector in an arbitrary vector space or as arbitrary co-occurrence data.

Current techniques for performing multi-class, multi-label categorization are typically either extensions of multi-class, single-label methods with ad-hoc assignment strategies (e.g., looser assignment thresholds as described above), or decompose the problem into multiple independent, binary, one-class-against-rest classification problems. Our method improves over existing alternatives in that a new object is directly assigned to multiple categories in a principled, probabilistic way, without the need to set any arbitrary assignment threshold. Furthermore, our method is able to implement dependencies between categories. This is done by organizing sets of categories in a hierarchy that embodies these dependencies. In addition, an independent "other" or "irrelevant" category may be included to assign to documents that fit in none of the more specific categories. A particular area of application for this technology is document categorization, i.e., where documents are commonly assigned multiple labels; in Xerox's Knowledge Pump, for example, a submission may be automatically assigned to several relevant communities.

The method of the invention directly addresses the relevant problem of assigning a set of labels to a document, and does so by considering all possible label sets, and not only single labels. The method also directly addresses the relevant problem of assigning multiple classes to a document. In addition, since a document is actually assigned a label set, the method is insensitive to the actual label number and to label permutation.

DETAILED DESCRIPTION OF THE EMBODIMENTS

Let us first introduce the notation and the model that will be used in the following. While the method of the invention applies to many different objects, for convenience, the method will be described with respect to a particular object type—documents. A document d from document space D shall be assigned a number of categories $l_1 \ldots l_P$, $l_{i \in \{1 \ldots L\}}$, where $1 \ldots L$ represent L possible object/document categories. The assigned categories $l_1 \ldots l_P$ represent the set of categories for which the object/document is relevant. We first define new labels, z, which are essentially all possible combinations of any number of the L categories:

$$z \in \{\{1\},\{2\}, \ldots \{L\}, \{1,2\}, \ldots \{1,L\}, \{2,3\}, \ldots \{1,2,3\}, \ldots \{1,2, \ldots L\}\}$$

For example, if L=3, the new labels z are $\{1\},\{2\},\{3\},\{1,2\},\{1,3\}, \{2,3\}, \{1,2,3\}$. For example, documents that are in both categories 1 and 3 are assigned labels $l_1=1$ and $l_2=3$ in the original set, and z=$\{1,3\}$ in the newly defined labels. Those documents are expected to have something in common with documents from category 1, as well as with documents from category 3. This information may be leveraged in order to improve the categorization.

The thrust of our method is that we impose a hierarchical structure on the label sets z in order to represent the fact that a document that is relevant to several categories will be at least partially relevant to any subset of these categories. The hierarchical generative model described in patent application D/A0A25 may be used to implement the hierarchy. In this model, a document is assumed to be modeled from a hierarchy containing categories (generating documents) and topics (generating words).

Figure 1:
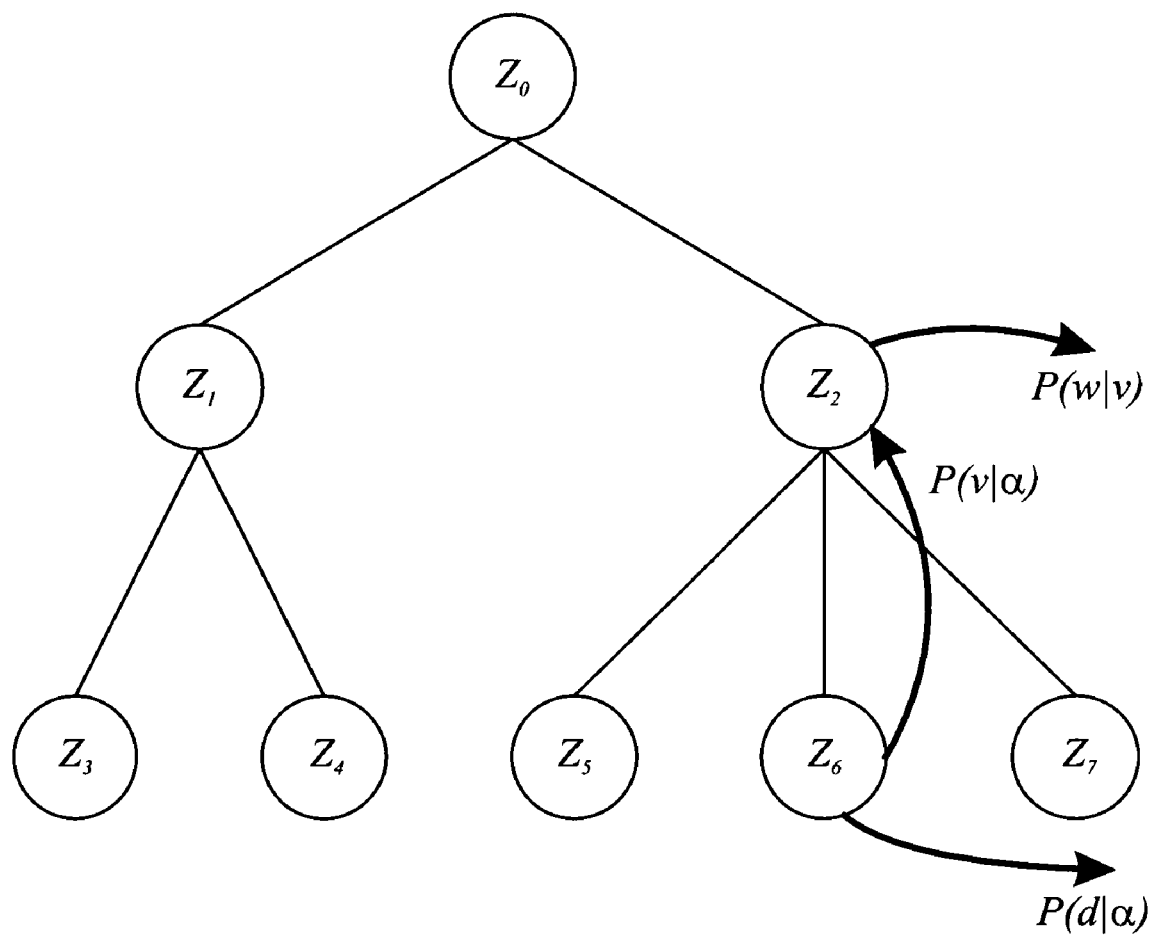
FIG. 1 illustrates a hierarchical model in which a document is assumed to be modeled by co-occurrences of words in the document, through a hierarchy containing classes (generating documents) and topics (generating words)

FIG. 1 illustrates an exemplary hierarchical model. Both categories and topics take the same values $z_0 \ldots z_7$, which are all the nodes in this exemplary hierarchy (note that this is not necessarily the case; another common situation would be to have classes on the leaves only). Referring to FIG. 1, $z_1$ and $z_2$ are subcategories of $z_0$; $z_3$ and $z_4$ are subcategories of $z_1$; and $z_5$, $z_6$ and $z_7$ are subcategories of $z_2$. For a document d, a document category $\alpha$ is chosen according to the probability $P(\alpha|d) \propto P(d|\alpha) P(\alpha)$, then a topic v is selected according to the category-conditional probability $P(v|\alpha)$, and finally a word is generated according to the topic-specific word distribution $P(w|v)$. If we restrict $P(v|\alpha)$ to give positive probability only to topics that are above the document category in the hierarchy, this means that the words in the documents of a given category are generated according to a mixture of the topics that are above this category in the hierarchy.

This model may also be used simply with the individual categories as leaves in order to implement single-label multi-class classification. This method has been used successfully in a number of contexts such as the categorization of newsgroup messages, or of abstracts and articles in biology. Methods for multi-label categorization that build on single-label classification such as thresholding and combination of binary classifiers (as mentioned above) may be applied naturally. However, the basic probabilistic model which uses categories as leaves cannot represent correctly the relationships between the class sets z. In order to do that we need to modify the hierarchy as follows.

Coming back to our original problem, the fact that the probabilistic model implements a topic-dependent mixture of labels has a very natural implication on the way we design the hierarchy that structures the label sets. As mentioned above, a document which is relevant to both category 1 (say, computer science) and category 3 (say, music) will have some vocabulary that is relevant to topic 1 (computer science), some that is relevant to topic 3 (music) as well as some that is relevant to both, i.e., computer music in our case. Accordingly, we want a document with a given label set z to involve words generated by any topic corresponding to a subset of the involved labels.

Figure 2:
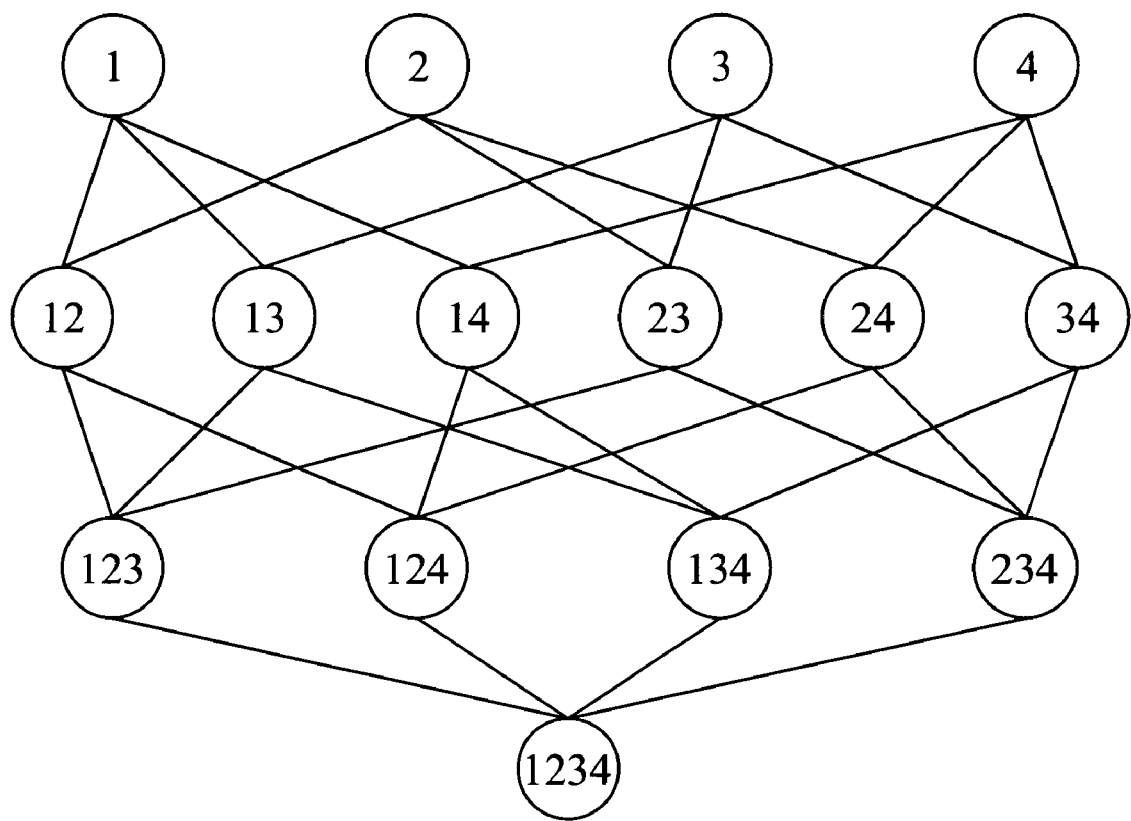
FIG. 2 illustrates an exemplary hierarchy for L=4 categories.

In the case of L=4 classes, this corresponds to the hierarchy presented in FIG. 2. A document from category $\{1,2,3\}$ is relevant to categories 1, 2 and 3, and contains words that are either typical of any of the three single categories (i.e., generated by the corresponding label), or typical of the joint $\{1,2\}$, $\{1,3\}$ or $\{2,3\}$ categories, but not from $\{2,4\}$ for example, even though it may have some vocabulary in common with another document from $\{2,4\}$ through their common connection to category 2.

For large numbers of categories, the size of the hierarchy increases exponentially as there are $2^L-1$ possible non empty sets of L categories. This drawback is common to all techniques that rely on an expansion of the number of labels to perform a single assignment to a set of labels. It is partially offset by the fact that even though a large number of label sets exist, only a small portion of them will actually be represented in the training data. Accordingly, during parameter estimation the unrepresented classes will get small probabilities, making it hard to choose them "by chance". On the other hand, even if class {2,4} is not represented in the training set (and therefore has low estimated prior probability), if a new document can be well-modeled by the vocabulary in categories 2 and 4, the high resulting likelihood may overcome the low prior to produce a reasonable posterior probability $P(z=\{2,4\}|d_{new})$ and thus warrant assignment of $d_{new}$ to both categories. In addition, the estimation of the topic-conditional word probabilities may be unreliable for topics associated with non-represented categories or category sets. In that case, we may rely on the mixture model, which gives this probability as a weighted average of the word probabilities in its parents:

$$P(w|\alpha) = \sum_{v\uparrow\alpha} P(w|v)P(v|\alpha),$$

where $v\uparrow\alpha$ means all labels v that are parents of category $\alpha$. Other parameters may be estimated using a standard Expectation Maximization (EM) algorithm or by a tempered version as described by in patent application D/A0A25.

Note that the hierarchical structure used here is not a tree, but a directed acyclic graph (DAG) (as illustrated in FIG. 2).

A natural extension of the method is to add an additional node for "irrelevant" or "other" documents, i.e., whatever does not fit in the other categories. For newswire stories, for example, there may be stories that do not fit in any of the fixed set of categories used for indexing, or alternatively, in the case where we do not include all categories (e.g., because some of them contain too few examples), an incoming story may also appear as irrelevant.

Figure 3:
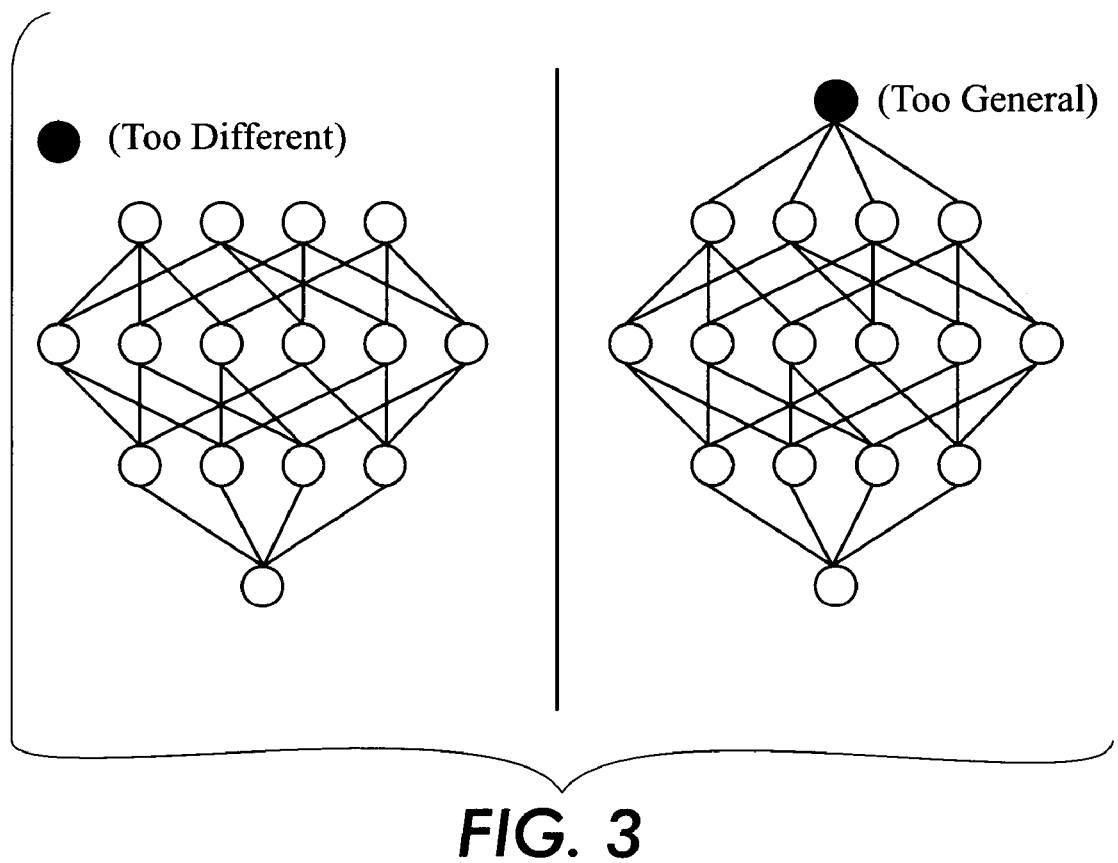
FIG. 3 illustrates the addition of a node for "other."

The additional node may be placed in two different ways (FIG. 3). If the node corresponds to a homogeneous class of documents of a different field, it may be set apart, independently from the hierarchy (left in FIG. 3). On the other hand, if the node should correspond to documents that contain only general language that is too unspecific to belong to any previous category, but can appear in any other document, it may be added at the top of the hierarchy, as displayed on the right of FIG. 3. This is a way to capture, for example, either empty words in the general sense (stop words) or words that are "empty" with respect to the current categorization task, i.e., that do carry meaning, although this meaning is irrelevant to the problem at hand.

The method of categorizing objects provides several improvements over existing techniques. For example, in the case of multi-label vs. single-label, we stated earlier that there is a definite difference between standard single-label multi-class categorization (essentially discrimination) and the multi-label, multi-class problem that our method tackles. For the categorization of documents at least, multi-label is a definite must as we are usually interested in finding all categories that are relevant. In other word, we are interested in assigning documents to non-exclusive classes. Accordingly, multi-label classification is able to handle problems that standard single-label classification cannot.

One of the usual ways to provide multiple assignments for a single document is to design several binary classifiers, usually one per class (as described above). This is the approach used for example for document classification using Support Vector Machines. The main drawback of this approach is that it treats all categories independently, although there are clear links between some of these categories. Our method improves over this technique by providing a way to represent the dependencies between categories through a hierarchy, and by learning the vocabulary that is specific to a combination of classes in the intermediate levels of the hierarchy.

For probabilistic classifiers, another standard way of building multi-label assignment over a standard single-label classifier is to threshold the posterior class probabilities so as to assign the document to all classes with posteriors higher than the threshold rather than only to the class with highest posterior (as described above). The drawback of this approach is that it requires an additional parameter (the threshold), which has to be either set ad hoc or learned from the data (usually using additional held-out data). For example, a way to set this threshold is to retain all classes that have a probability significantly higher than uniform (if one has no opinion about the correct class, arguably the posterior should be uniform). By contrast, our method improves on this method by proposing a full framework for multi-label assignment and does not require any additional parameter to be set. The document is assigned all labels in the most probable label set.

Once the new labels z are defined, the multi-class, multi-label problem has been reduced to a multi-class, single-label problem, and the categorization task boils down to choosing the single best label set z for a document. Any standard discriminative or generative categorization technique may then be used on the new labels z to effectively provide multi-label categorization. However, this would essentially amount to treating, e.g., assignments to {1} and to {1,3} as independent, whereas documents that are in both categories 1 and 3 are expected to have something in common with documents from category 1 alone. Our method, on the other hand, leverages this information through the hierarchy in order to improve the categorization.

McCallum, A. K. (1999) Multi-Label Text Classification with a Mixture Model Trained by EM, *AAAI'99 Workshop on Text Learning* (McCallum 1999) proposed solving the multi-label assignment problem by using a multi-level generative model where first a set of labels are sampled (equivalent to our label set z), then mixing weights between the individual labels contained in the set are sampled, then a single label associated with a category c is chosen according to these mixing weights, and finally a word is sampled in this class according to the class-conditional word distribution P(w|c) as in our model.

Our method offers several improvements over the model from McCallum (1999). First we model a document using a mixture of label subsets and not simply a mixture over single-label classes. This means that we can define a vocabulary related to computer music, which may be distinct from simply a mixture of the vocabulary of computer science and that of music. This introduces additional flexibility in our model.

A second difference is that, at categorization time, we use fixed mixing weights $P(v|\alpha)$ for each label set. These mixing weights may be either set to some specified weight profile as described below, or they may be learned during parameter estimation (typically using the Expectation Maximisation algorithm in a tempered version). The advantage of this approach is that mixing weights are identical for all words and all documents belonging to a label set.

Additionally, our method employs a hierarchy that explicitly models dependencies between classes and class sets. The parameter estimation procedure is then able to identify relevant hierarchical relationships from the data and discard useless relationships by giving them negligible probability. This is an improvement over methods that do not implement a hierarchy between classes.

In accordance with another aspect of the invention, a method of categorizing objects provides several ways to perform the parameter estimation in the hierarchical clustering model described in D/A0A25. Any document in the collection may be assigned to a first node in the hierarchy based on a first segment of the respective document, and the respective document may be assigned to a second node in the hierarchy based on a second segment of the respective document, wherein the first and second nodes are associated with different paths of the hierarchy. A representation of the hierarchy of nodes is stored in a memory and the representation is made available to an entity in response to a request associated with the document collection. An additional method of defining the probability parameter includes defining it such that the probability is inversely proportional to a distance of a node to the first class and defining it such that the probability parameter of a node is proportional to the number of documents that belong to the node.

The categorizer in this embodiment addresses the issue of parameter estimation. The model is expressed by the following equation:

$$P(i, j) = \sum_\alpha P(\alpha)P(i/\alpha)\sum_v P(j/v)P(v/\alpha)$$

The last part expresses the fact that a word j may be generated by any node v above it in the hierarchy. There is actually some redundancy in this expression, as $$\sum_v P(j/v)P(v/\alpha) = \sum_v P(j, v/\alpha) = P(j/\alpha).$$

This means that there are more parameters to fit—$P(j/v)$, $P(v/\alpha)$—than degrees of freedom. The most basic technique consists in letting the expectation maximization algorithm find parameter values that maximize the likelihood. It turns out that this often results in degenerate situations, where the class conditional node probability $P(v/\alpha)$ is peaked on one node, indicating that instead of generating words from all nodes v above a class $\alpha$, the model actually generates words from a single node, meaning that the resulting model is not really a hierarchy. In order to fix this problem, we propose several alternative ways of setting the parameters $P(v/\alpha)$:

1. Set $P(v/\alpha)$ to a uniform distribution over all nodes above a class $\alpha$,
2. Set $P(v/\alpha)$ such that the probability is inversely proportional to the distance to class $\alpha$ (i.e., the probability for nodes higher in the tree is smaller than the probability for nodes close to class $\alpha$),
3. Set $P(v/\alpha)$ such that the probability is proportional to the number of documents (or words) that belong to this node, with added smoothing to handle empty nodes (so a word is more likely to be generated by a "popular" category).

Other ways of setting the class-conditional node probability can be devised. We consider that all methods that set $P(v/\alpha)$ either to fixed values (case 1.), or to values that depend on the distance between v and a (case 2.), or to values that depend on the number of documents in a node (case 3.), or a combination thereof, are obvious extensions and are covered by the present invention.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for categorizing a set of objects, comprising: defining a set of categories in which at least one category in the set is dependent on another category in the set;
organizing the set of categories in a hierarchy that embodies any dependencies among the categories in the set;
for each object, assigning to the object one or more categories $l_1 \ldots l_P$, where $l_{i \in \{1} \ldots L\}$ from a set $\{1 \ldots L\}$ of possible categories, wherein the assigned categories represent a subset of categories for which the object is relevant;
defining a new set of labels z comprising all possible combinations of any number of the categories, $z \in \{\{1\}, \{2\}, \ldots \{L\}, \{1,2\}, \ldots \{1,L\}, \{2,3\}, \ldots \{1,2,3\}, \ldots \{1,2, \ldots L\}\}$, wherein if an object is relevant to several categories, the object must be assigned the unique label z corresponding to the subset of all relevant categories; and
assigning to the object the several categories and the subcategories of the several categories;
wherein an object comprises a document d generated by co-occurrence of words within the document;
wherein the hierarchy is generated by:
for each document d, choosing a document category $\alpha$ according to the probability $P(\alpha|d) \propto P(d |\alpha)P(\alpha)$;
selecting a label v according to the category-conditional probability $P(v|\alpha)$:
selecting a word in the document according to a label-specific word distribution $P(w|v)$: and
restricting $P(v|\alpha)$ to give positive probability only to labels that are above the category in the hierarchy.

2. The method of claim 1, wherein an object is expressed as a vector in an arbitrary vector space.

3. The method of claim 1, wherein the set of categories further includes an independent category for including objects that fit none of the other categories in the set.

4. The method of claim 1, wherein the hierarchy comprises a directed acyclic graph.

5. The method of claim 1, wherein the hierarchy organizes the sets of categories which embodies dependencies between the categories.

6. The method of claim 1, wherein the category-conditional probability is defined as a uniform distribution over all nodes above the first class.

7. The method of claim 1, wherein the category-conditional probability is inversely proportional to a distance of a node to a first class.

8. The method of claim 1, wherein the category-conditional probability of a node is proportional to the number of documents that belong to the node.

* * * * *